(12) United States Patent
Verma et al.

(10) Patent No.: US 7,389,303 B2
(45) Date of Patent: Jun. 17, 2008

(54) METHOD AND SYSTEM FOR SUPPORTING MULTIPLE INDEPENDENT TRANSACTIONAL RESOURCE MANAGERS ON A SINGLE LOGICAL VOLUME

(75) Inventors: Surendra Verma, Bellevue, WA (US); Jacob Lacouture, Redmond, WA (US); Brian D. Andrew, Redmond, WA (US); Jon Cargille, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 577 days.

(21) Appl. No.: 10/611,683

(22) Filed: Jun. 30, 2003

(65) Prior Publication Data

US 2005/0021487 A1    Jan. 27, 2005

(51) Int. Cl.
G06F 17/30    (2006.01)
(52) U.S. Cl. .................................. 707/102; 707/205
(58) Field of Classification Search ................ 707/205, 707/102; 718/100; 726/4; 711/112; 710/305
See application file for complete search history.

(56) References Cited

U.S. PATENT DOCUMENTS

| | | | |
|---|---|---|---|
| 5,668,958 A * | 9/1997 | Bendert et al. .............. 710/305 |
| 6,738,971 B2 * | 5/2004 | Chandrasekaran et al. .. 718/100 |
| 6,760,733 B1 * | 7/2004 | Komine et al. .............. 707/102 |
| 6,845,425 B2 * | 1/2005 | Fought et al. ............... 711/112 |
| 2003/0130986 A1 * | 7/2003 | Tamer et al. ................... 707/1 |
| 2003/0200467 A1 * | 10/2003 | Choy et al. .................. 713/202 |
| 2004/0015668 A1 * | 1/2004 | McBrearty et al. .......... 711/163 |
| 2004/0172629 A1 * | 9/2004 | Tene et al. ...................... 718/1 |

* cited by examiner

*Primary Examiner*—Tim Vo
*Assistant Examiner*—Olubusola Omosewo
(74) *Attorney, Agent, or Firm*—Workman Nydegger (57) ABSTRACT

A system and method supporting multiple independent transactional resource managers on a single logical volume, in which each resource manager is a unit of storage management. Each resource manager independently maintains metadata associated with a collection of files that are contained within the scope of a resource manager, such as the files within a subdirectory corresponding to the resource manager. A general architecture allows databases or other entities to integrate with a transactional file system volume via the resource managers, whereby each database has its files independently associated with a transactional resource manager such that database operations do not affect other operations on the volume. Having independent resource managers allows different levels of performance, reliability, feature availability, and manageability to be specified within a single volume. Functions to create, start, and shut down a resource manager are also provided, along with other functions that facilitate resource manager usage.

5 Claims, 6 Drawing Sheets

METHOD AND SYSTEM FOR SUPPORTING MULTIPLE INDEPENDENT TRANSACTIONAL RESOURCE MANAGERS ON A SINGLE LOGICAL VOLUME

FIELD OF THE INVENTION

The invention relates generally to computer systems, file systems and transactions.

BACKGROUND OF THE INVENTION

U.S. patent application Ser. No. 09/539,233, herein incorporated by reference in its entirety, describes a system and method by which multiple file system operations may be performed as part of a single user-level transaction. The transaction can be distributed among independent resources including the transactional file system volume, using a distributed transaction coordinator and a two-phase commit protocol. In this manner, there is no intermediate state in which some changes associated with the transaction will commit but not others. In general, two things happen when a change commits. First, the change becomes durable, in that it will persist until explicitly overwritten by the user. Second, the change becomes visible to users of the system who have not explicitly associated their views of the system with the specific transaction containing the change. Thus, for example, a user can make a number of changes to various files (e.g., modify some, create new files, delete others, rename and so forth), and have either all of those changes commit as a whole, or abort with none of the changes committed.

A transactional file system is highly useful. Further, transactional file systems are essentially necessary for integrating databases with file systems. With a transactional file system, a database maintains some of its data (such as a field of blob data) in files, and maintains in the database enough information to identify that file within the file system. This information can take any form, such as a UNC fully qualified network name or another file identifier. In this manner, a database record can be tied to a file. As can be readily appreciated, transaction processing is needed so that the operation performed on the file can be committed with other database actions via the two-phase commit protocol.

To perform such distributed transaction, each file referenced by the database maps to a transactional resource manager, which in general is a subsystem that implements the transactional semantics of the resource. This subsystem is part of the transactional file system. The semantics of and implementation details regarding the transactional file system are described in the aforementioned patent application Ser. No. 09/539,233.

This transactional file system, like other file systems, uses a volume as the atomic unit of traditional (non-transactional) storage management, e.g., volumes manage their own disk space and are often backed up, restored, and managed as a single unit. However, problems arise with this model with respect to transactions, particularly when databases or other applications are engaging in distributed transactions with the transactional file system. This is because such volume-level management at times prevents multiple databases and other entities from operating completely independently. For example, the recovery of one database following a crash will be tied to the recovery of other databases sharing the same unit of transactional management, as there is only one transactional log per unit of transactional management, and usability of the transactional log is influenced, among other things, by the recovery process, and the recovery process of one resource manager is tied to the recovery of all other resource managers with which it has engaged in distributed transactions. Thus, if one of the databases fails to recover, the entire transactional file system volume may be unrecoverable, which may yet render any other databases using the file system unrecoverable as well.

As the sizes of volumes and the number of users and applications sharing a volume continue to grow, a model in which actions taken with respect to one entity adversely affect the actions of another entity becomes unworkable, and an alternative solution is needed. Moreover, a single large volume may be used for a variety of different tasks, each of which likely will have different performance characteristics and other differences. Several settings affecting performance are made at the level of the transactional resource manager. Having the same settings span the entire volume thus often results in a highly inefficient model.

SUMMARY OF THE INVENTION

Briefly, the present invention provides a system and method in which multiple independent transactional resource managers are supported on a single logical volume, such that each resource manager becomes (in part) a unit of storage management. Instead of having one resource manager per logical file system volume, the single volume may be broken up into smaller parts with respect to transactional services.

Each resource manager independently maintains a set of transactional metadata associated with the resources (e.g., a collection of files) that are contained within its scope. For example, transactional metadata used to guarantee transactional consistency such as a log file, along with files used in a transaction, may comprise the set of resources within the scope of control of a resource manager. The resource manager is thus defined by the collection of files for which it is responsible. Any scheme may be used to define the collection. A simple scheme is one where files are associated with the resource manager by having a common ancestor in a directory hierarchy. In this implementation, the resource manager can be thought of as corresponding to the sub-tree rooted at the ancestor, since the files in that sub-tree are managed by the resource manager.

A general architecture is provided that allows databases or other entities to be integrated with a transactional file system volume via the resource managers. For example, each database may include a table having a column containing references (e.g., in the form of UNC names) to files in the file system volume that are associated with a resource manager. Because multiple transactional resource managers are possible on a single volume, each database may have its own associated files, which may be separately collected on a logical part of the volume that is independently associated with a transactional resource manager. Because the independent resource managers are separate units of management, operations to a database such as recovery do not affect the operations of other databases or other users of volume. Further, users can select properties on a per-resource manager basis, such as the size of the log file and/or the type of logging to be performed, to obtain different levels of performance, reliability, feature availability, and manageability within a single volume.

In one implementation, each resource manager is viewed by the file system as being a subdirectory under which files (including possibly other subdirectories) are associated, thus forming a collection of files by a logical association in the file system hierarchy. In this implementation, each resource manager has special properties and attributes, which may include per-resource manager transaction-related metadata such as a TOPS stream, TxF file and TxF Log of a transactional file system (TxF). It may also contain metadata that was formerly maintained per-volume, such as journaling information, though this is not necessary.

To facilitate use of a resource manager, application programming interfaces may be provided, including functions to create, start, and shut down a resource manager. Other functions may be defined, such as to back up and restore the files associated with a resource manager, and employ point in-time-recovery of a particular state in time of a resource manager.

Other advantages will become apparent from the following detailed description when taken in conjunction with the drawings, in which:

DETAILED DESCRIPTION

Exemplary Operating Environment

Figure 1:
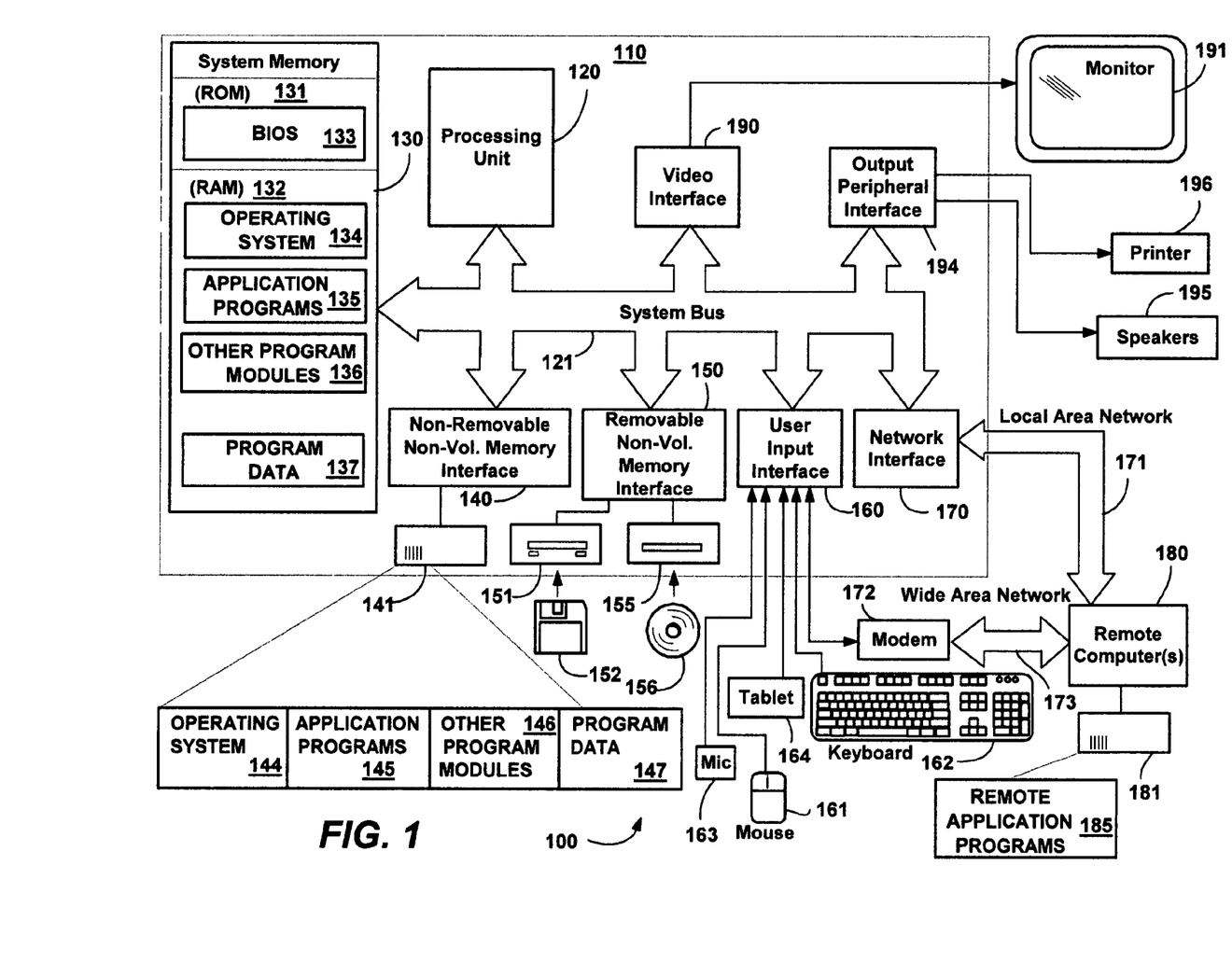
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Multiple Independent Transactional Resource Managers on a Single Logical Volume

The present invention will primarily be described in the context of a transactional file system, which has been implemented in a Microsoft® NTFS file system environment, and which may be part of a distributed transaction environment. In general, resources that are manipulated in the context of transactions have a transactional resource manager, which in turn may work with a distributed transaction coordinator and a two-phase commit protocol to ensure that an entire transaction is committed as a whole, or the transaction is aborted as a whole. The files on an NTFS transactional file system are examples of such resources.

In accordance with an aspect of the present invention, instead of having one resource manager per logical file system volume, the volume may be broken up into smaller parts with respect to transactions, by having multiple, independent resource managers on a single volume. This provides numerous benefits in a distributed transactions environment, as well as with local transactions, as will be readily apparent from the description below. As will be understood, however, the present invention would provide similar benefits in any file system and/or environment having transaction-like services to multiple distinct consumers of those services, whether they are users, applications, other services, and so forth.

Figure 2:
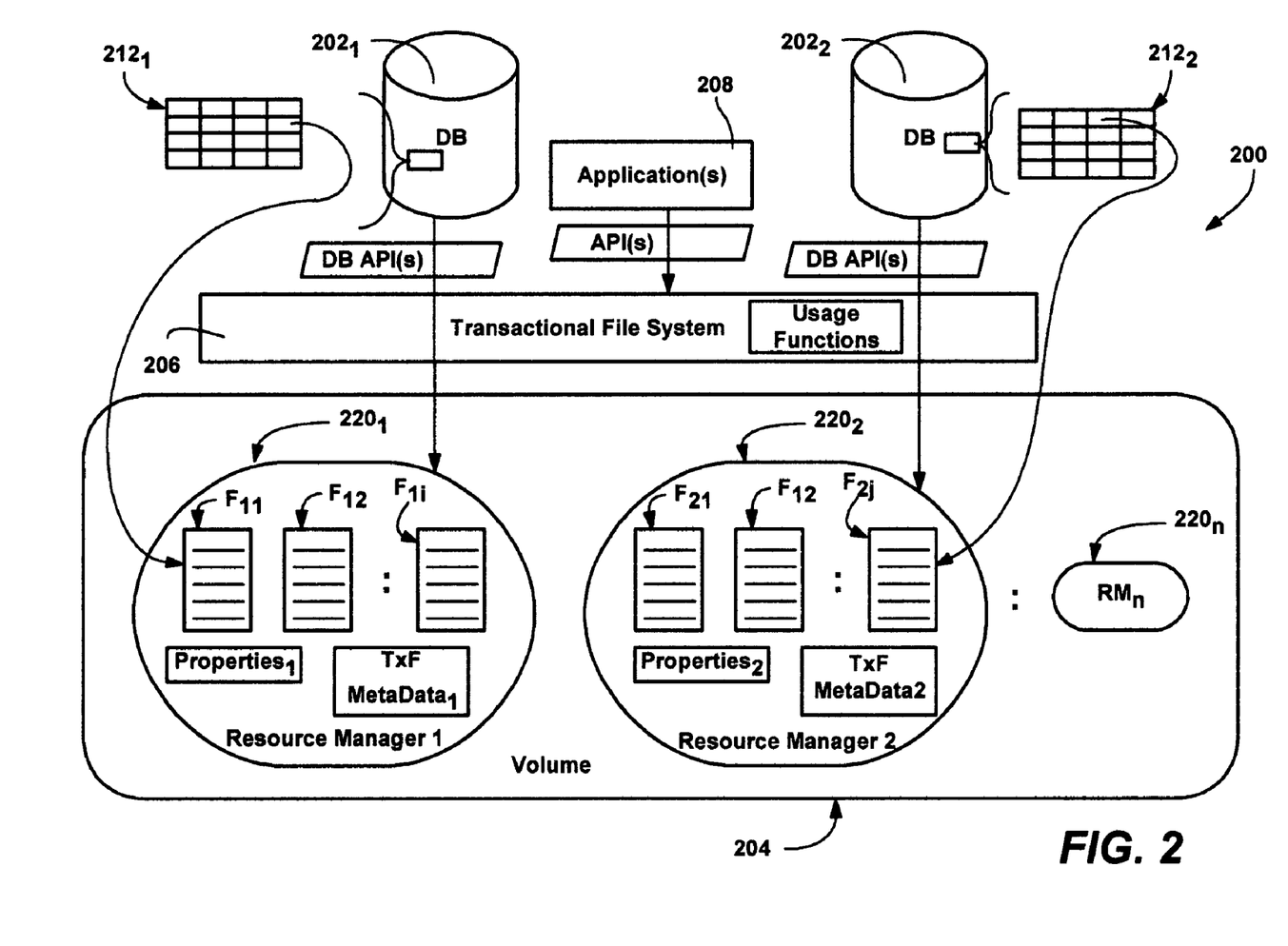
FIG. 2 is a block diagram generally representing an architecture in which multiple databases each operate with an independent transactional resource manager on a single volume, in accordance with an aspect of the present invention.

FIG. 2 shows a general architecture 200 in which a plurality of databases $202_1$ and $202_2$ are integrated with a file system volume 204. To this end, APIs are provided through which the databases $202_1$ and $202_2$ may place API calls to the transactional file system 206. Although only two such databases are represented in FIG. 2, it is understood that any practical number of databases may be present in a given system, and also that a database may include references to more than one volume (and/or more than one resource manager per volume). Also note that application programs 208 and the like may access the volume 204 via file system APIs that are appropriate for applications, as well as through the database.

As shown in the example of FIG. 2, the databases $202_1$ and $202_2$ may include tables ($212_1$ and $212_2$ respectively) having references to files $F_{11}$-$F_{1i}$ and $F_{21}$-$F_{2j}$ in the file system volume 204. The references, which may be in the form of UNC names or any suitable mechanism to identify files, are represented in FIG. 2 by the curved arrows from the tables $212_1$ and $212_2$ to files $F_{11}$ and $F_{2j}$, respectively. For example, a column may be reserved in the table for maintaining such external references for each record, as needed.

In accordance with an aspect of the present invention, multiple transactional resource managers are possible on a single volume, whereby each database may have its own files on a part of the volume that is independently associated with a transactional resource manager. For example, as represented in FIG. 2, the database $202_1$ is associated with resource manager $220_1$ while the database $202_2$ is associated with resource manager $220_2$. Note that as used herein, the concept of "files" includes "subdirectories" (which can be considered as a particular type of file having certain attributes) and "resource managers" which is a special type of directory. As such, any file system object including file, directory and resource manager may be referred to as a file herein. Further, note that other resource mangers (e.g., $220_n$) are possible on a volume, and need not be associated with a database.

In general, each resource manager is an object that participates in a transaction and provides a subsystem that implements a transaction-protected resource. The resource manager typically provides transactional services and functionality, e.g., exposed through APIs. In the example of FIG. 2, the resource managers $220_1$ and $220_2$ are transactional file system resource managers that provide transactional file system services to their respective database programs. The resource manager is thus the unit of management for various resources that do not exist in non-transacted file systems, as well as for some resources (e.g., log files) that do. Note that the types of log files that are managed by transactional resource managers are very different from the log file that a traditional file system (like NTFS) maintains. For example, there is only one NTFS metadata log per volume, which logs metadata operations that are at a logically lower level (e.g., relating to allocation information) than the information that the TxFLog logs. Notwithstanding, other things may be managed at the resource manager level that were previously managed at the volume level. For example, a resource manager may be marked as read-only, whereby any writes to any file in the resource manager's scope will fail. Other actions such as to invalidate handles to any files in the resource manager, enable compression on an resource manager and so forth are also feasible with the resource manager being a unit of management.

In keeping with the present invention, a resource manager acts as a (new) unit of storage management that independently maintains a set of metadata associated with the resources (e.g., files) that are contained within its scope. Examples of new resources within the scope (under the control) of a resource manager include the various types of metadata that are used to guarantee transactional consistency, such a log file, for example. Note that a file that is under a resource manager may be associated only with that resource manager. This means that in the previous example in which files are associated with a specific resource manager based on their parent directory, a hardlink from a file to another parent directory would have to be forbidden, unless it were appropriately identified as invalid for the purpose of assigning a resource manager. This is because when a file is accessed in a transacted file system, the file system needs to know exactly which resource manager is responsible for maintaining the transactional metadata for that file. Thus, the scope of a resource manager is defined by the collection of files for which it is responsible. This may be any collection of files, including (but not necessarily) files associated by being members of a directory hierarchy with a common ancestor as described herein. Files may be associated in other ways, such as by having the same file extension, having timestamps within a common time frame, by sizes, and may even have tags stored within that identifies a resource manager through some other means. Therefore, if each resource manager describes a set of files, any group of such sets is non-intersecting.

Furthermore, transactional metadata related to specific files may be associated with the resource manager. Since the resource manager is the object responsible for generating and maintaining this metadata, and for providing transactional capabilities for the files under the resource manager, it is also the object through which a user may control how those capabilities are provided.

There are various options from which users can select that allow the user to select various options offering different levels of performance, reliability, feature availability, and manageability. Each of these options are per-resource manager, instead of per volume, hence the resource manager being considered as a "unit of management."

Figure 3:
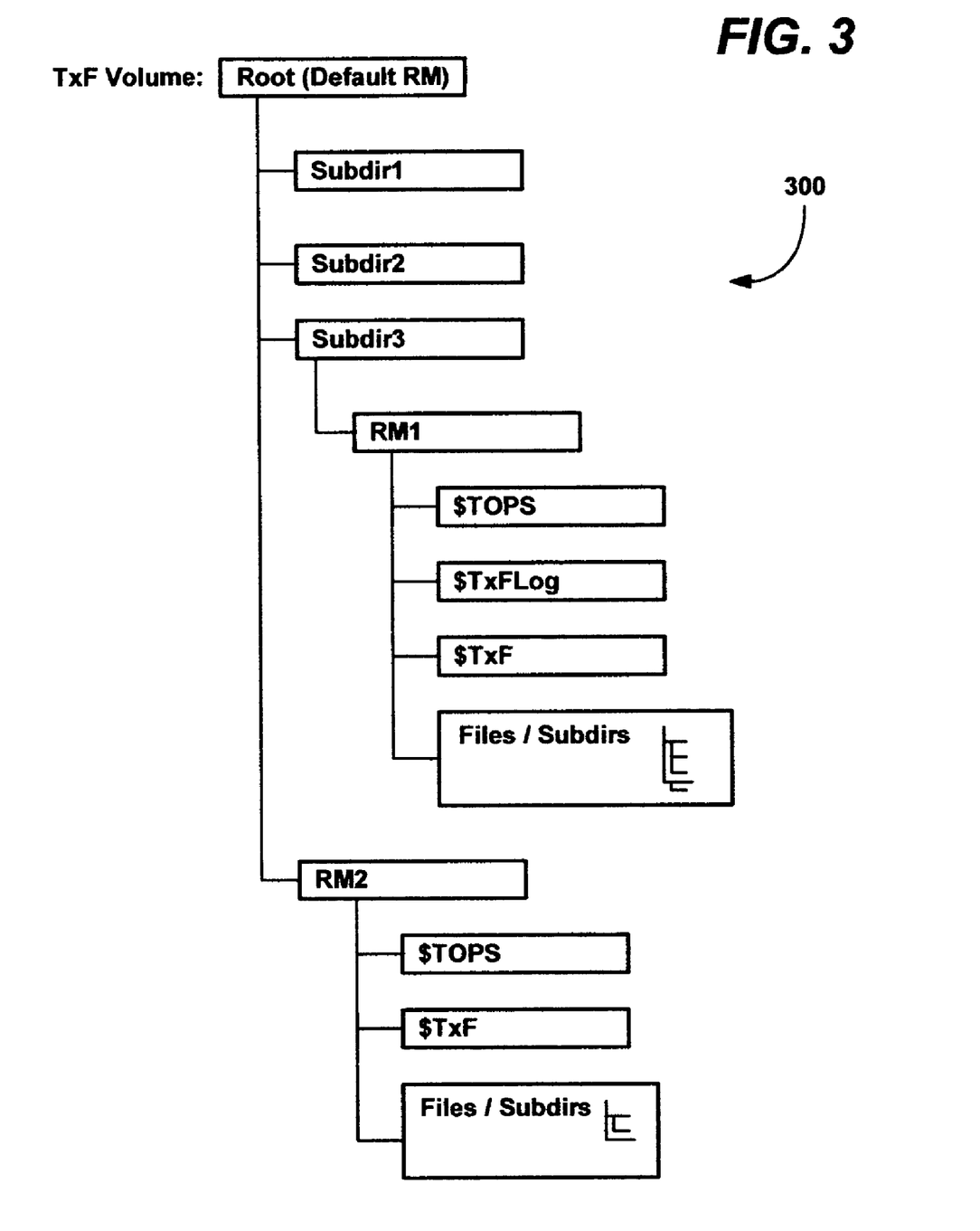
FIG. 3 is a representation of a hierarchical file system directory hierarchy tree including multiple resource managers, in accordance with an aspect of the present invention.

With respect the above example implementation, to allow for multiple resource managers within a file system volume, each resource manager is viewed by the file system as being a subdirectory, under which files (including possibly other subdirectories) are associated, as generally represented in FIG. 3. However, the resource manager "subdirectories" have special properties and attributes, including per-resource manager transaction-related metadata (including metadata that was formerly maintained per-volume). Such metadata may include the TOPS stream ($TOPS) and the TxF Log ($TxFLog) as described in the aforementioned patent application Ser. No. 09/539,233. Note that the log may be maintained in a remote location for durability, e.g., to be accessible for recovery if the volume fails, and/or to be maintained on a highly-reliable or highly-available disk subsystem, and the txflog need not be located physically beneath the RM root, as in FIG. 3 wherein there is no $TxFLog under RM2. Other transaction-related information may include a set of one or more $TxF identifiers useful in identifying the files within the resource manager's namespace. Such identifiers are described in U.S. patent application Ser. No. 10/293,425, entitled "Identifying Files within a Namespace." Note that in the above-described example implementation, it may be desirable to add the restriction that resource managers cannot be nested within other resource managers (other than the default resource manager, described below), although such a restriction is not a requirement.

As an independent unit of management, the properties of a resource manager are generally related to various parameters and modes that would not necessarily be the same for other resource managers, and thus often do not fit well with settings for an entire volume. For example, the size of the log file may be specified per resource manager, since that is something that varies with various types of transactions. The type of logging mode is also something that may vary depending on the circumstances of what is to be logged, e.g., full logging may be appropriate for one database, while simple undo logging would be sufficient for another and full and implicit (redo only, for non-transactions) logging may best fit another situation. Other properties are related to transactional consistency/versioning, error logging, and so forth. For example, consider a scenario where one database will use several resource managers to provide different semantics for the different files with which it works, e.g., if the database stores video and picture data, the database may want to do full logging on the files containing pictures, but simple logging on the files containing video. In keeping with the present invention, the ability to have multiple transactional resource managers on a single volume facilitates having such different properties to match the different needs of various users, databases and other entities.

In the above-described example implementation, in which the files associated with a resource manager are defined as having a common ancestor (the special subdirectory) in the directory hierarchy, a mechanism is provided by which the file system can differentiate a resource manager (root) from a conventional subdirectory. In an NTFS file system implementation, a master file table (or similar database) contains information generally in the form of records about the files (including subdirectories) therein. To differentiate, each resource manager root is flagged in the master file table (e.g., by setting a flag) that indicates that each resource manager is a special type of directory having the information needed to support transactions.

In an example implementation, every volume has a default resource manager, which becomes the default depository for transactional metadata for all files that are not part of secondary resource managers. As represented in FIG. 3, the user can create a secondary resource manager root at any point in the tree 300. Files created below that point in the tree 300 are then logically part of that resource manager. Any transactional metadata relating to those files or the resource manager (e.g., the transactional log) are stored at a location logically below that resource manager root in the tree, and the transactional properties will be decided based on the policy set up for that secondary resource manager. This allows multiple users of the same volume to configure different resource managers differently, whereby resource managers can be managed at a more granular scale than the entire volume (hence a transactional file system resource manager being a unit of management).

It should be noted that although the above-described implementation essentially ties a resource manager's scoping to a hierarchical directory structure, in alternative implementations resource managers can include files on a volume based on other scoping rules. For example, files with an extension of .XYZ may belong to a resource manager. Other ways to group files together, such as via a user specified function that is evaluated on the file name/properties, and/or via a query with a result comprising a collection, are also feasible. This example provides clear benefits. For example, it may be a significant performance optimization to have only simple transactional semantics provided to video files, such as those ending in .mpg, .mov, and the like, and it thus may be desirable to assign such files to a different resource manager. It is also feasible to specify an association between a file and a resource manager, such as at file creation time, and have that association remain for the file's lifetime or until otherwise removed, regardless of where the file is on the volume. Note that the hierarchical design is responsible for needing to avoid hard links across resource managers.

Files may be within the scope of a specific volume, but may also be associated with specific directories or users at a lower level. By allowing multiple resource managers to exist on a single volume, files may be managed dynamically. This is beneficial, particularly as sizes of storage volumes grow large, whereby it is common for many users to store files on the same volume. If desired, each user could create his own resource managers. Via multiple, separately administered resource managers, each user could then manage the user's own files, and perform different tasks for which the resource manager properties can be customized to match different performance characteristics, providing opportunities for optimization.

Notwithstanding, when transactional semantics are desired a user need not set up a resource manager, because it is possible for more than one user to share a common resource manager. Note however that in many implementations, it will be necessary that the user should trust the owner of the resource manager being used, because the security model may be such that the owner of the resource manager root can access and modify any data stored within the resource manager. One possibility is that users of the resource manager can be made aware of this by guaranteeing that a user cannot put any ACLs (access control lists) on any files that do not already give the resource manager owner full access.

Figure 4:
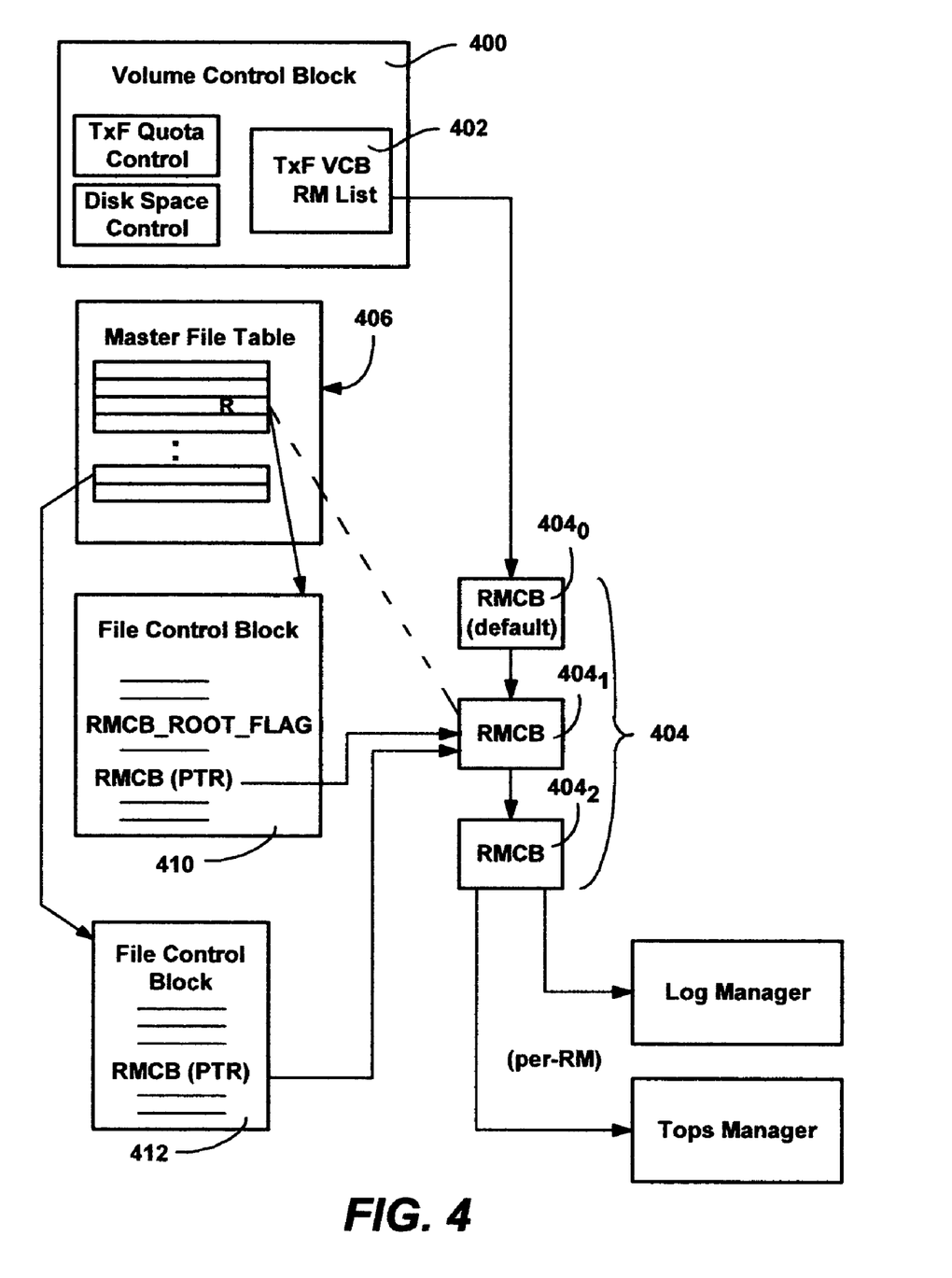
FIG. 4 is a block diagram generally representing the relationship among data structures maintained by one example file system in order to support multiple resource managers, in accordance with an aspect of the present invention.

FIG. 4 shows a general arrangement and operation of the internal file system structures used to manage resource managers in an example NTFS-based implementation in which the resource manager descriptor is a file. It should be noted, however, that other solutions are possible. For example, the resource manager "root" need not be a file, but rather may be an entry in a database that contains information about the location of the log file and what transactional semantics to provide. Each file on the volume can then contain a reference to that database entry. In such a scenario, the resource manager descriptors are not located within the file system.

As represented in FIG. 4, at the time the volume is mounted, a volume control block (VCB) 400 is created by the file system, which is essentially an in-memory representation of the state of the volume's data that is used by the file system used to manage the volume. The volume control block 400 contains a transactional file system (TxF) component 402 (a VCB extension) which, in accordance with an aspect of the present invention, contains references to the resource manager control blocks (three are shown in FIG. 4, $404_0$-$404_2$). As described above, there is always at least one resource manager control block (RMCB) $404_0$ for the volume, such that any file transacted file that is not associated with a user-created secondary resource manager (e.g., $404_1$ and $404_2$ in FIG. 4) still belongs to a resource manager root.

It should be noted that in one implementation, only open resource managers are included in the list of resource manager control blocks, and there need not be any overall index of both open and closed resource managers maintained by the file system. Nevertheless, such an overall index of all (open and closed) resource managers is feasible and straightforward to maintain. A resource manager is open if it is actively providing transactional services, in communication with a transaction manager, running recovery, in a transition state, and so forth. A resource manager is closed if it doing none of these types of things, and simply exists in a state where it may be opened at a later time.

As is known in general with NTFS, whenever a file is created/opened, a file control block (FCB) is created, comprising an in-memory data structure in which a file system maintains state data for the open file. Data from the master file table 406 is used to obtain some of the data. Continuing with the example, as described above, the master file table 406 includes a flag location (attribute), RMCB_ROOT_FLAG, which if set indicates that a file object being opened is a resource manager descriptor. In the example of FIG. 4, at least one record has the flag set, as represented by the uppercase R in the set of records therein (in one implementation the flag is actually a bit). Note that like subdirectories, resource managers are like files in that they will have a file control block when opened, and also will have a handle essentially comprising a pointer to that file control block that is returned to the caller.

In the example of FIG. 4, two file control blocks 410 and 412 are shown. Each file control block has a field which, if associated with a transactional resource manager, contains a pointer to a resource manager control block, such as the resource manager control block $404_1$ in FIG. 2. In FIG. 2, the file control block 410 is flagged with the RESOURCE MANAGER CONTROL BLOCK_ROOT_FLAG, indicating that the file control block contains the state data for a resource manager, including a pointer to the resource manager control block $404_1$. In FIG. 4, as is readily apparent from the pointer in the file control block 412 to the same resource manager control block $404_1$, the file control block 412 is a file (which may be a file or a subdirectory) associated with the resource manager represented by the file control block 410.

Figure 5:
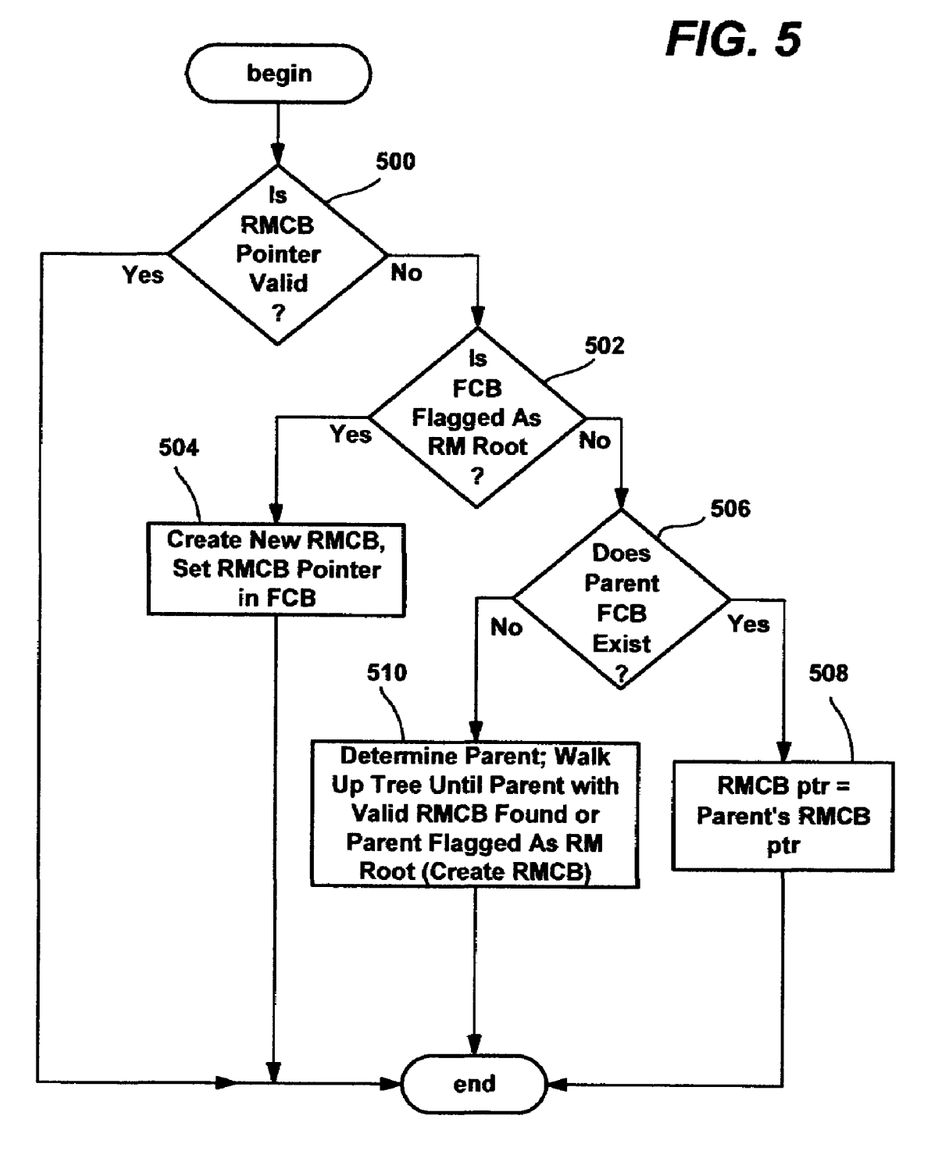
FIG. 5 is a flow diagram generally representing a process performed by the example file system to determine with which resource manager control block a file control block is associated, in accordance with an aspect of the present invention.

Whenever a file is opened, the file system determines whether an association with a resource manager is appropriate for that file, and if so, with which resource manager that file is associated. FIG. 5 represents a process by which the file system automatically makes this determination.

Step 500 tests whether there already is a valid (non-NULL) pointer to a resource manager control block in the file control block for this file. If so, the association is known from the resource manager control block. If not, further evaluation is required.

Step 502 tests whether the file control block indicates (via data copied from the master file table) whether the file control block is flagged as a resource manager root in the tree. If so, the open is being directed to a resource manager, and thus step 502 branches to step 504 to create a new resource manager control block for this file, and store a pointer to this resource manager control block in the appropriate file control block field, as described above. Note that this works because if any resource manager control block exists in memory, its root file control block also exists and is pointing to it, as in general these blocks may be inserted together and torn down together. The resource manager control block is also added to the set (e.g., list) of open resource manager control blocks for the volume.

If not a resource manager root at step 502, step 506 is executed to determine whether a file control block exists for the parent file (directory) of the file. For example, the parent folder may have been opened, which is the case given a path/filename with the open request, or if another file with that parent was previously opened. However there are other ways to open a file by an identifier, such as via an offset into the master file table, in which the full path is not directly known, and thus there may not be a file control block for the parent file.

If a file control block for the parent exists, then by definition that parent is also associated with the same resource manager as the child, and in essence already has gone through the process of determining an associated resource manager. Note that in this example, there is always at least one resource manager for the volume. Thus, step 506 branches to step 508 where the resource manager control block pointer in the file control block is set to point to the same resource manager control block as the parent.

In the event that no parent file control block exists, then the process essentially walks up the tree looking for either a higher parent's file control block that does exist, or a higher parent that is a resource manager root. Note that each object in the file system knows its parent (e.g., via a reference in the master file table), and the process of FIG. 5 can be essentially repeated using the parent's data, although it is understood that with higher parents, the file control block will have the resource manager control block pointer added thereto based on some higher parent's information. As is readily understood from following the logic of FIG. 5 with the data of a parent, in the event that a higher parent is found without a valid resource manager control block pointer but is flagged as an resource manager control block root, the resource manager control block root is created for that parent, added to the list of resource manager control blocks, and the pointer thereto set in the parent's file control block and any children file control blocks.

In this manner, a file system is able to determine the associated resource manager for any file. The above process is highly efficient, because any time that a valid resource manager control block pointer is found, it is used and the process ended, whereby thereafter there is no need to further walk up the tree.

Figure 6:
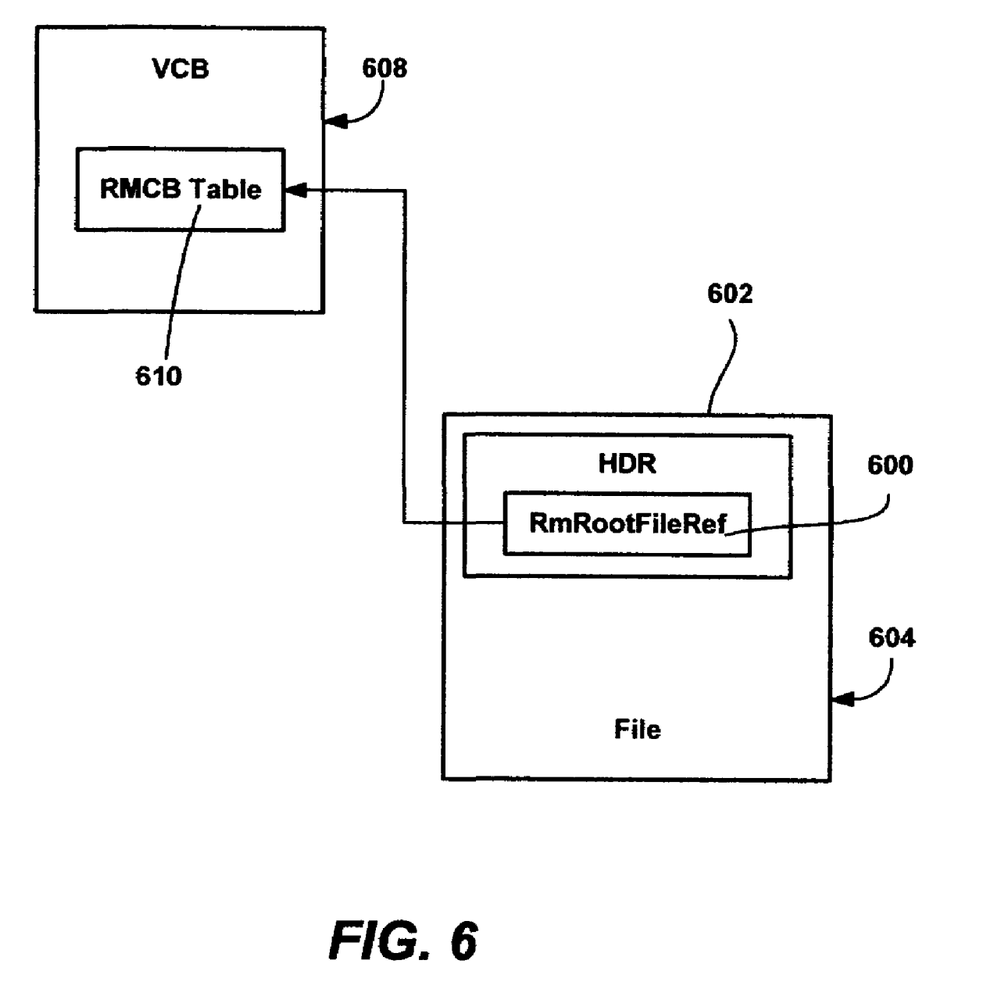
FIG. 6 is a block diagram showing an alternative resource manager control block discovery and tracking mechanism, in accordance with an aspect of the present invention.

In an alternative discovery mechanism to the process of FIG. 5, as represented in FIG. 6, a file reference 600 of the resource manger root may be stored as part of the on-disk header information 602 for each file on the volume, (e.g., the file 604 in FIG. 6). This provides an even more efficient determination of the resource manager association in the case of open-by-identifier create operations, provides a performance improvement as well as the ability to perform a more rigorous disk corruption checking, and may also simplify the implementation.

In general, with this alternative, the resource manager discovery process works by having the volume control block 608 contain (or otherwise be associated with) a table 610 to store the resource manager control blocks on that volume. The table is keyed by the file reference of the resource manager root. When the file 604 is opened, the reference 600 (RmRootFileRef) is read from the file's header 602, and is used to search the table 610 for a matching resource manager control block. If no resource manager control block exists, one is created, and the file control block for the file adjusted to have a pointer to it. In this alternative implementation, the flag for the resource manager root is no longer needed in the master file table, as instead, a resource manager root is defined as a file having a reference (RmRootFileRef) that points to itself. Further, in this alternative implementation, there is no longer a requirement that the resource manager root's file control block and the resource manager control block enter and leave memory together. Note that when the resource manager is started, the resource manager root file control block is present, because a handle must be open on the resource manager root in order to start it and keep it running. If the last handle closes, the resource manager may be shut down.

As is understood, the resource manager is thus a new unit of management, however it should be noted that the resource manager is also a subcomponent of another independently managed unit, namely the volume. To avoid or resolve any collisions between management policies, the transactional file system specifies clear levels at which certain policies need to be set. In general, the transactional file system leaves any present volume-level management policies unchanged. For example, disk space is a shared resource, and may be added or removed from a volume, as that is the unit of management for disk space. Using this example, when a volume became low on space, it would be impractical for an administrator to have to add disk space at a resource manager level, where potentially thousands of resource managers may exist. Instead of separately adding space for each resource manager, disk space is managed at the volume level, as represented in FIG. 4. As also represented in FIG. 4, quota is also controlled per-volume, although (in an alternative implementation) the resource manager control blocks may report usage to a volume-wide control mechanism.

In general, the new management facilities provided by having multiple resource managers according to the present invention are at a lower level, (e.g., to each user, or to each workload on a volume), and do not apply at a volume level. For example, operations such as backup and restore, snapshots, point-in-time recovery and so forth may be performed at the resource manager level, and thus operated independently of other resource managers. Resource managers are self-contained entities (except for possibly the log which may be remote) and can thus be transported to another volume, renamed and otherwise moved around; resource managers have a unique name (e.g., a GUID) so that their identity is maintained regardless of their actual location. Resource managers can be copied, such as by an Xcopy operation, (however this may change the unique name in certain operations).

To facilitate usage of resource managers, various usage-related functions may be provided, such as in the form of application programming interfaces. In one implementation, functions may include those to create a resource manager, start a resource manager, shutdown a resource manager, and close a resource manager (close an open handle, which may or may not shut down the resource manager). Other functions such as roll forward redo and undo, e.g., that take a backup time and a recovery time as parameters, also may be provided. Note that with respect to recovery and roll forward operations, there may be separate APIs to do the forward phase (redo phase) and the reverse phase (undo phase), and the redo API may be called multiple times.

In an implementation in which the resource manager is a subdirectory, the create resource manager function essentially converts an already existing subdirectory (identified by a handle) into a resource manager, which in an NTFS implementation includes setting the resource manager root flag in the master file table, and as described above, also include creating a file control block and a resource manager control block, and setting a pointer in the file control block to point to the resource manager control block. In an alternative implementation in which the resource manager properties may be entered into a completely different store, such as a database, the file system may be provided with a mechanism of querying those properties when a file (presumably created with a pointer to that information) is opened for transactional access.

Note that in a subdirectory-based implementation that allows hard links, such as NTFS-based, the subdirectory is required to be empty before creation of the resource manager, so that the problem of handling such hard links is eliminated, and thus the call is failed if not empty. Other ways of handling the problem include having it managed by another entity, e.g., trusting the other entity to ensure that there are no hard links across a resource manager boundary, or verifying that this is the case via a tree traversal. In any event, if successfully created, the create resource manager returns a success indication to the caller. Further, note that in one implementation, security is based on file access rights, and any owner of a resource manager has rights to any files under that resource manager.

Also, in such an implementation, creating a resource manager with respect to a restore operation requires additional consideration, in that the resource manager root flag (e.g., a bit) needs to be set in the master file table to identify the restored directory as a resource manager. However, this needs to be done before restoring, because the create API described above that sets this bit has been specifically designed to not allow the bit to be set unless a directory is completely empty (to ensure that the boundary is maintained that prevents hard links from crossing resource managers). Thus, the directory needs to be created and the resource manager created therefrom, before restore begins.

The start resource manager function is called with the previously returned handle when not already open, or another handle (regardless of how obtained) and performs various tasks to prepare the resource manager for usage. In the case of the NTFS-based transaction file system, such tasks include opening the log, creating the $TxF file as needed, and starting to perform work including logging transactional operations. Other parameters may be provided with the call, including the directory of the log file, and settings for other per-resource manager properties (e.g., the size of the log and the logging mode), as discussed above.

Note that other handles may be opened to the resource manager, e.g., by anyone having access, and closing the handle results in a counter or the like being decremented to zero. One possible feature is that when the count reaches zero, the resource manager is shut down and needs to be restarted. This has advantages because if an application controlling the resource manager crashes, its handles will be closed by the operating system, whereby such a feature will trigger a resource manager shutdown. This is generally preferable to leaving the resource manager running until the application restarts (which may be never). There is also a shutdown function to shut down the resource manager; for example, the recovery process may be triggered by the first access of any resource maintained by the resource manager. Recovery is a user-initiated operation, but may be automated.

If the resource manager is stopped, it may be in an inconsistent state, whereby the resource manager needs to be recovered. It is possible that other ways of accessing the file system may make full recovery not possible by changing the state while the resource manager is shut down, such as by deleting files via another program's application programming interface. In one alternative implementation, this may be prevented by locking the files from access (at least from normal access) while the resource manager is shut down. However in another implementation, such access is allowed. The locking (or not) may be made a user configurable option. If access is allowed, techniques such as warnings, hiding files from view by default, and so forth can help avoid such access in this implementation, however the recovery program should be robust enough to handle state changes that occurred while the resource manager is shut down. The file system can detect and store data about any activity that occurred while the resource manager is shut down.

In an implementation in which a subdirectory provides the basis for a resource manager, a resource manager may be deleted like any subdirectory, which in general may require that the directory be empty before deleting. Depending on the type of file system and/or whether the files are locked while the resource manager is shut down, any hidden or private files and the like (e.g., those used to maintain transaction metadata) that are not ordinarily accessible by the user may be an exception to such a "delete only empty subdirectory" rule, as needed to allow deletion of the resource manager. Further, when a resource manager is active, the $TOPS file and $Txf metadata files, which are otherwise user accessible files, are not allowed to be accessed by the user (these files need not present in a given implementation, and if present, need not be located under the RM root, but may be located elsewhere, including on a different type of file system). The $TOPS file and $Txf metadata files (if present) are important, however, and thus it may be desirable to back up these files. A snapshot may be taken to essentially make a copy of these files without shutting down the resource manager.

As can be seen from the foregoing detailed description, there is provided a method and system in which multiple independent transactional resource managers are supported on a single logical volume, such that each resource manager becomes (in part) a unit of storage management. As a result, many actions taken with respect to one resource manager and database or the like need not affect the actions of another resource manager/other database. The performance characteristics and other differences may be customized per resource manager, enabling efficient performance of tasks.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a distributed computing environment, a method of determining a resource manager associated with a file in order to allow the resource manager to monitor transactional relations for that file within a volume, the method comprising:

identifying an opening of a file object chosen from a plurality of file objects within a volume of a file system, wherein transactions associated with the plurality of file objects are monitored by a corresponding resource manager chosen from a plurality of resource managers for the volume, and wherein each of the plurality of resources managers is a file object that participates in a file object transaction and provides a subsystem that implements a transaction-protected resource that monitors and controls changes to file objects within its scope defined by the collection of file objects for which it is responsible such that a file object within a resource managers scope is associated only with that resource manager and the resource manager independently maintains a set of metadata and provides transactional capabilities for all file objects within its scope, which guarantees transactional consistency;

based on the opening of the file object, creating a file control block that provides an in-memory data structure in which the file system maintains state for the open file object, wherein the file control block forms part of a hierarchical data structure within the file system's directory tree, which includes a root file object representing a default resource manager for files not managed by other resource managers in the file system and at least one subdirectory file object under the root file object representing another resource manager within the directory tree, wherein both the root file object and the at least one subdirectory file object include special properties and attributes, including per-resource manager transactional-related metadata maintained on a per resource manager basis, rather than on a per volume basis, and wherein the default resource manage becomes the default depository for transactional metadata for all files that are not part of the at least one subdirectory resource manager;

determining if the file control block includes a valid pointer to a resource manager control block, wherein if no valid control block exists for the resource manager control block, the method further comprises;

determining if the file control block is flagged as the at least one subdirectory file object in the directory tree, wherein if the control block is flagged as such, a new resource manager control block for the file object is created and a pointer to the new resource manager control block is stored in a field for the file control block created, and wherein if the file control block is not flagged as the subdirectory file object, the method further comprises:

determining whether a file control block exists for a parent file object in the directory tree, wherein if the file control block for the parent exists, determining a resource manager control block for the parent file object and assigning a pointer to the file control block to the file object opened that references the resource manager control block for the parent file object, and wherein if no parent file control block exists, the method further comprises:

traversing the directory tree until a higher parent with a valid resource manager control block is found or a higher parent is flagged as the root file object or the at least one subdirectory file object, wherein if a valid resource manager control block is found for the higher parent, a pointer to the valid resource manager control block is including in a field of at least the file control block for the file object open, and wherein if the control block for the higher parent is flagged, a new resource manager control block for the control block for the higher parent is created and a pointer thereto is included in a field for at least the file control block for the file object created.

2. The method of claim 1, wherein the method further comprises:

upon creating the file control block, copying thereto a portion of data from a master file table that includes records for each of the plurality of file objects in the file system, and wherein at least one record in the master file table includes a flag attribute set indicating that the at least one subdirectory file object corresponds to a resource manager descriptor.

3. The method of claim 2, wherein if a record used to copy the portion of data to the file control clock includes the flag attribute indicating that a new resource manager control block should be created, the method further comprises:

accessing a volume control block that includes a transactional file system component, which updates references to resource manager control blocks, the volume control block providing an in-memory representation of state for a volume's data used by a file system to manage the volume; and adding information about the new resource manager control block to the transactional file system component referencing the new resource manager control block created, and wherein the transaction file system component includes a list of references to a plurality of resource manager control blocks in the volume.

4. The method of claim 3, wherein the list of references to the plurality of resource manager control blocks included in the transactional file system are only for resource managers that are open such that the plurality of resource manager within the list are actively providing one or more of transactional services, communication with a transaction manager, running recovery, or in a transition state.

5. The method of claim 4, wherein a resource manager is considered closed if it simply exists in a state where it may be opened at a later time.

* * * * *